US012811750B2

(12) United States Patent
Ma et al.

(10) Patent No.: US 12,811,750 B2
(45) Date of Patent: Nov. 24, 2026

(54) METHODS AND APPARATUSES FOR DETERMINING SLOT FORMAT

(71) Applicant: Lenovo (Beijing) Limited, Beijing (CN)

(72) Inventors: Ruixiang Ma, Beijing (CN); Yuantao Zhang, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 264 days.

(21) Appl. No.: 18/715,510

(22) PCT Filed: Dec. 3, 2021

(86) PCT No.: PCT/CN2021/135392
§ 371 (c)(1),
(2) Date: May 31, 2024

(87) PCT Pub. No.: WO2023/097667
PCT Pub. Date: Jun. 8, 2023

(65) Prior Publication Data
US 2025/0038923 A1 Jan. 30, 2025

(51) Int. Cl.
*H04L 5/00* (2006.01)

(52) U.S. Cl.
CPC .......... *H04L 5/0053* (2013.01); *H04L 5/0007* (2013.01); *H04L 5/0094* (2013.01)

(58) Field of Classification Search
CPC ............................ H04L 5/0007; H04L 5/0094
USPC ............................ 370/329, 401, 402, 3, 405
See application file for complete search history.

(56) References Cited

U.S. PATENT DOCUMENTS

2021/0152418 A1 5/2021 Abdelghaffar et al.
2021/0352667 A1 11/2021 Abotabl et al.
2021/0360676 A1 11/2021 Fakoorian et al.
2024/0057050 A1* 2/2024 Zhang ........................ H04L 5/14
2024/0098760 A1* 3/2024 Abotabl ................ H04L 5/0092

FOREIGN PATENT DOCUMENTS

BR 112019008988 A2 * 10/2019 ........... H04L 1/1614
WO 2021043287 A1 3/2021

OTHER PUBLICATIONS

PCT/CN2021/135392 , "International Search Report and Written Opinion", International Application No. PCT/CN2021/135392, Sep. 2, 2022, 6 pages.

* cited by examiner

*Primary Examiner* — Dang T Ton
(74) *Attorney, Agent, or Firm* — FIG. 1 Patents

(57) ABSTRACT

The present application relates to methods and apparatuses for determining a slot format. One embodiment of the present disclosure provides a user equipment (UE), which includes: a transceiver configured to: receive first configuration information indicating at least one frequency domain resource of at least one first sub-band within one band width part (BWP) of a first number of time units; and a processor configured to: determine one or more first transmission directions of the at least one first sub-band within the BWP for each time unit of the first number of time units at least according to the first configuration information.

20 Claims, 10 Drawing Sheets

METHODS AND APPARATUSES FOR DETERMINING SLOT FORMAT

TECHNICAL FIELD

The present disclosure relates to the 3rd Generation Partnership Project (3GPP) 5G New Radio (NR), especially to methods and apparatuses for determining a slot format.

BACKGROUND OF THE INVENTION

3GPP Rel.18 will probably introduce a new duplexing scheme that enables simultaneous use of downlink and uplink within a time division duplex (TDD) carrier using non-overlapped frequency resource, which may be referred to as sub-band full duplex. This duplex mode aims to extend the duration over which uplink transmission could occur for improving the uplink coverage and capacity. The simultaneous use of downlink (DL) and uplink (UL) is only at base station (BS) side and not at user equipment (UE) side. Accordingly, the UE needs to determine the slot format when the sub-band full duplex is applied at BS side.

Accordingly, it is desirable to provide methods and apparatuses for determining a slot format.

SUMMARY

One embodiment of the present disclosure provides a user equipment (UE), which includes: a transceiver configured to: receive first configuration information indicating at least one frequency domain resource of at least one first sub-band within one band width part (BWP) of a first number of time units; and a processor configured to: determine one or more first transmission directions of the at least one first sub-band within the BWP for each time unit of the first number of time units at least according to the first configuration information.

In some embodiments of the present disclosure, the first configuration information indicates a starting resource block (RB) index and a total number of RBs of each sub-band of the at least first one sub-band separately or jointly; or the first configuration information indicates the occupied RB group (RBG) of each sub-band of the at least first one sub-band by a first bitmap with each bit corresponding to an RBG.

In some embodiments of the present disclosure, the processor is further configured to: determine the one or more first transmission directions of the at least one first sub-band for each time unit of the first number of time units according to the first configuration information and one of the following rules: the first transmission direction of the at least one first sub-band in each time unit of the first number of time units is uplink or downlink; the first transmission direction of the at least one first sub-band in all flexible time units of the first number of time units is uplink or downlink, or the first transmission direction of the at least one first sub-band in a time unit of the first number of time units is determined according to a dedicated transmission direction configuration.

In some embodiments of the present disclosure, the transceiver is further configured to: receive second configuration information indicating at least one time unit within the first number of time units in which the first transmission directions of the at least one first sub-band is uplink or downlink; and wherein the processor is further configured to: determine the one or more first transmission directions of the at least one frequency domain resource for each time unit of the first number of time units according to the first configuration information and the second configuration information.

In some embodiments of the present disclosure, the second configuration information includes a second number of slots and a third number of symbols among flexible slots of the first number of time units; or the second configuration information includes a second bitmap with each bit corresponding to a time unit in the first number of time units.

In some embodiments of the present disclosure, the transceiver is further configured to: receive one or more second configuration information, wherein each second configuration information indicates transmission directions for one sub-band of the at least one first sub-band within the BWP of the first number of time units; and wherein the processor is further configured to: determine the one or more first transmission directions of the at least one first sub-band within the BWP for each time unit of the first number of time units according to the first configuration information and the one or more second configuration information.

In some embodiments of the present disclosure, the transceiver is further configured to: receive third configuration information indicating a transmission direction format combination in a transmission direction format combination set, wherein each transmission direction format combination includes one or more transmission direction format of one or more time units, and each transmission direction format indicates at least one transmission direction of at least one first sub-band for a time unit; and wherein the processor is further configured to: determine the one or more first transmission directions of the at least one first sub-band for each time unit of the first number of time units according to the first configuration information and the third configuration information.

In some embodiments of the present disclosure, each transmission direction format is included in a transmission direction format set, and wherein the transmission direction format set is predefined or indicated by fourth configuration information received by the transceiver.

In some embodiments of the present disclosure, the transmission direction format combination set is predefined or indicated by fifth configuration information received by the transceiver.

In some embodiments of the present disclosure, the transceiver is further configured to: receive sixth configuration information indicating a second transmission direction of a second sub-band within the BWP of a second time unit, wherein the second sub-band is included in the at least one first sub-band, and the second time unit is included in the first time units; and wherein the processor is further configured to: if the second transmission direction of the second sub-band of the second time unit is different from the first transmission direction of the second sub-band of the second time unit, determine a final transmission direction of the second sub-band of the second time unit according to first transmission direction.

Another embodiment of the present disclosure provides a Base Station (BS), which includes: a processor configured to: determine one or more transmission directions of at least one first sub-band within one band width part (BWP) for each time unit of a first number of time units; and a transceiver configured to: transmit first configuration information indicating at least one frequency domain resource of the at least one first sub-band within the BWP of the first number of time units.

In some embodiments of the present disclosure, the first configuration information indicates a starting resource block (RB) index and a total number of RBs of each sub-band of the at least first one sub-band separately or jointly; or the first configuration information indicates at least one occupied RB group (RBG) of each sub-band of the at least first one sub-band by a first bitmap with each bit corresponding to an RBG.

In some embodiments of the present disclosure, the processor is further configured to: determine the one or more first transmission directions of the at least one first sub-band for each time unit of the first number of time units according to the first configuration information and one of the following rules: the first transmission direction of the at least one first sub-band in each time unit of the first number of time units is uplink or downlink; the first transmission direction of the at least one first sub-band in all flexible time units of the first number of time units is uplink or downlink, or the first transmission direction of the at least one first sub-band in a time unit of the first number of time units is determined according to a dedicated transmission direction configuration.

In some embodiments of the present disclosure, the transceiver is further configured to: transmit second configuration information indicating at least one time unit within the first number of time units in which the first transmission directions of the at least one first sub-band is uplink or downlink.

In some embodiments of the present disclosure, the second configuration information includes a second number of slots and a third number of symbols among flexible slots of the first number of time units; or the second configuration information includes a second bitmap with each bit corresponding to a time unit in the first number of time units.

In some embodiments of the present disclosure, the transceiver is further configured to: transmit one or more second configuration information, wherein each second configuration information indicates transmission directions for one sub-band of the at least one first sub-band within the BWP of the first number of time units.

In some embodiments of the present disclosure, the transceiver is further configured to: transmit third configuration information indicating a transmission direction format combination in a transmission direction format combination set, wherein each transmission direction format combination includes one or more transmission direction format of one or more time units, and each transmission direction format indicates at least one transmission direction of at least one first sub-band for a time unit.

In some embodiments of the present disclosure, each transmission direction format is included in a transmission direction format set, and wherein the transmission direction format set is predefined or transmitted via a fourth configuration information to a user equipment (UE).

In some embodiments of the present disclosure, the transmission direction format combination set is predefined or transmitted via a fifth configuration information to a user equipment (UE)

In some embodiments of the present disclosure, the transceiver is further configured to: transmit sixth configuration information indicating a second transmission direction of a second sub-band within the BWP of a second time unit, wherein the second sub-band is included in the at least one first sub-band, and the second time unit is included in the first time units.

Yet another embodiment of the present disclosure provides a method for determining a time unit format, which includes: receiving first configuration information indicating at least one frequency domain resource of at least one first sub-band within one band width part (BWP) of a first number of time units; and determining one or more first transmission directions of the at least one first sub-band within the BWP for each time unit of the first number of time units at least according to the first configuration information.

In some embodiments of the present disclosure, the first configuration information indicates a starting resource block (RB) index and a total number of RBs of each sub-band of the at least first one sub-band separately or jointly; or the first configuration information indicates the occupied RB group (RBG) of each sub-band of the at least first one sub-band by a first bitmap with each bit corresponding to an RBG.

In some embodiments of the present disclosure, the method further includes: determining the one or more first transmission directions of the at least one first sub-band for each time unit of the first number of time units according to the first configuration information and one of the following rules: the first transmission direction of the at least one first sub-band in each time unit of the first number of time units is uplink or downlink; the first transmission direction of the at least one first sub-band in all flexible time units of the first number of time units is uplink or downlink, or the first transmission direction of the at least one first sub-band in a time unit of the first number of time units is determined according to a dedicated transmission direction configuration.

In some embodiments of the present disclosure, the method further includes: receiving second configuration information indicating at least one time unit within the first number of time units in which the first transmission directions of the at least one first sub-band is uplink or downlink; and determining the one or more first transmission directions of the at least one frequency domain resource for each time unit of the first number of time units according to the first configuration information and the second configuration information.

In some embodiments of the present disclosure, the second configuration information includes a second number of slots and a third number of symbols among flexible slots of the first number of time units; or the second configuration information includes a second bitmap with each bit corresponding to a time unit in the first number of time units.

In some embodiments of the present disclosure, the method further includes: receiving one or more second configuration information, wherein each second configuration information indicates transmission directions for one sub-band of the at least one first sub-band within the BWP of the first number of time units; and determining the one or more first transmission directions of the at least one first sub-band within the BWP for each time unit of the first number of time units according to the first configuration information and the one or more second configuration information.

In some embodiments of the present disclosure, the method further includes: receiving third configuration information indicating a transmission direction format combination in a transmission direction format combination set, wherein each transmission direction format combination includes one or more transmission direction format of one or more time units, and each transmission direction format indicates at least one transmission direction of at least one first sub-band for a time unit; and determining the one or more first transmission directions of the at least one first sub-band for each time unit of the first number of time units according to the first configuration information and the third configuration information.

In some embodiments of the present disclosure, each transmission direction format is included in a transmission direction format set, and wherein the transmission direction format set is predefined or indicated by fourth configuration information received by the transceiver.

In some embodiments of the present disclosure, the transmission direction format combination set is predefined or indicated by fifth configuration information received by the transceiver.

In some embodiments of the present disclosure, the method further includes: receiving sixth configuration information indicating a second transmission direction of a second sub-band within the BWP of a second time unit, wherein the second sub-band is included in the at least one first sub-band, and the second time unit is included in the first time units; and if the second transmission direction of the second sub-band of the second time unit is different from the first transmission direction of the second sub-band of the second time unit, determining a final transmission direction of the second sub-band of the second time unit according to first transmission direction.

Still another embodiment of the present disclosure provides a method for determining a time unit format, which includes: determining one or more transmission directions of at least one first sub-band within one band width part (BWP) for each time unit of a first number of time units; and transmitting first configuration information indicating at least one frequency domain resource of the at least one first sub-band within the BWP of the first number of time units.

In some embodiments of the present disclosure, the first configuration information indicates a starting resource block (RB) index and a total number of RBs of each sub-band of the at least first one sub-band separately or jointly; or the first configuration information indicates at least one occupied RB group (RBG) of each sub-band of the at least first one sub-band by a first bitmap with each bit corresponding to an RBG.

In some embodiments of the present disclosure, the method further includes: determining the one or more first transmission directions of the at least one first sub-band for each time unit of the first number of time units according to the first configuration information and one of the following rules: the first transmission direction of the at least one first sub-band in each time unit of the first number of time units is uplink or downlink; the first transmission direction of the at least one first sub-band in all flexible time units of the first number of time units is uplink or downlink, or the first transmission direction of the at least one first sub-band in a time unit of the first number of time units is determined according to a dedicated transmission direction configuration.

In some embodiments of the present disclosure, the method further includes: transmitting second configuration information indicating at least one time unit within the first number of time units in which the first transmission directions of the at least one first sub-band is uplink or downlink.

In some embodiments of the present disclosure, the second configuration information includes a second number of slots and a third number of symbols among flexible slots of the first number of time units; or the second configuration information includes a second bitmap with each bit corresponding to a time unit in the first number of time units.

In some embodiments of the present disclosure, the method further includes: transmitting one or more second configuration information, wherein each second configuration information indicates transmission directions for one sub-band of the at least one first sub-band within the BWP of the first number of time units.

In some embodiments of the present disclosure, the method further includes: transmitting third configuration information indicating a transmission direction format combination in a transmission direction format combination set, wherein each transmission direction format combination includes one or more transmission direction format of one or more time units, and each transmission direction format indicates at least one transmission direction of at least one first sub-band for a time unit.

In some embodiments of the present disclosure, each transmission direction format is included in a transmission direction format set, and wherein the transmission direction format set is predefined or transmitted via a fourth configuration information to a user equipment (UE).

In some embodiments of the present disclosure, the transmission direction format combination set is predefined or transmitted via a fifth configuration information to a user equipment (UE)

In some embodiments of the present disclosure, the method further includes: transmitting sixth configuration information indicating a second transmission direction of a second sub-band within the BWP of a second time unit, wherein the second sub-band is included in the at least one first sub-band, and the second time unit is included in the first time units.

DETAILED DESCRIPTION

Figure 1:
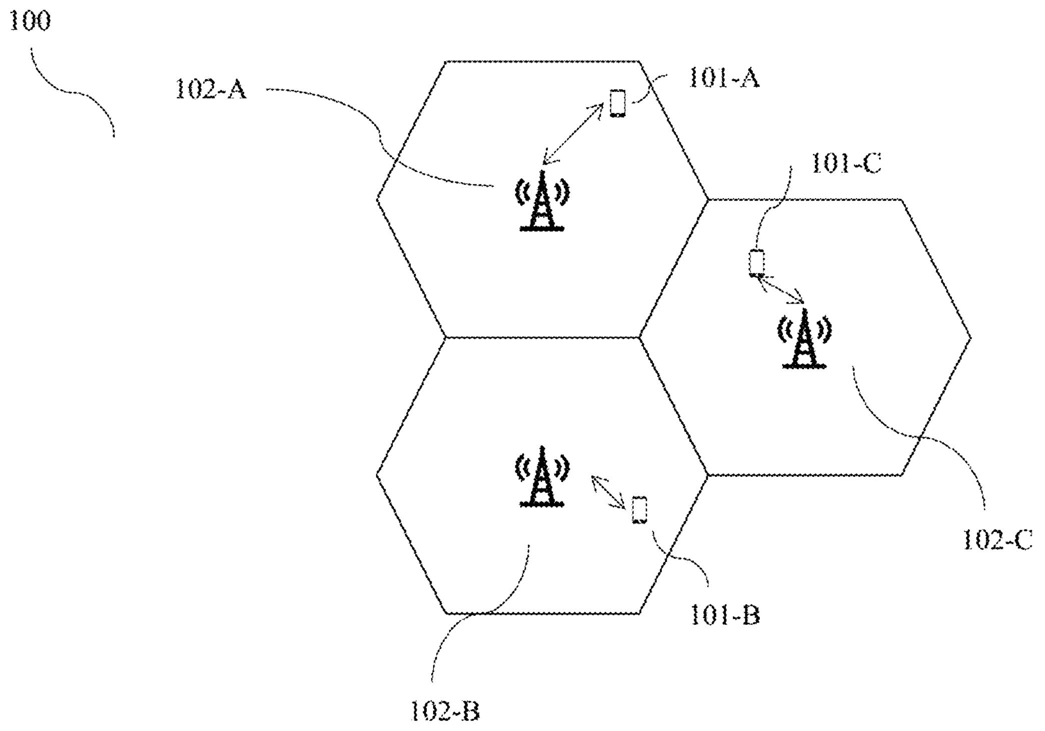
FIG. 1 illustrates a schematic diagram of a wireless communication system according to some embodiments of the present disclosure.

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

While operations are depicted in the drawings in a particular order, persons skilled in the art will readily recognize that such operations need not be performed in the particular order shown or in sequential order, or that all illustrated operations be performed, to achieve desirable results, sometimes one or more operations can be skipped. Further, the drawings can schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing can be advantageous.

FIG. 1 depicts a wireless communication system 100 according to an embodiment of the present disclosure.

As shown in FIG. 1, the wireless communication system 100 includes three UEs, UE 101-A, UE 101-B, and UE 101-C, and three BSs, BS 102-A, BS 102-B, and BS 102-C. Even though a specific number of UEs and BSs are depicted in FIG. 1, it is contemplated that any number of UEs and BSs may be included in the wireless communication system 100.

The UEs may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs include wearable devices, such as smart watches, fitness bands, optical head-mounted displays, or the like. Moreover, the UEs may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs may communicate directly with the BSs via uplink (UL) communication signals.

The BSs may be distributed over a geographic region. In certain embodiments, each of the BSs may also be referred to as an access point, an access terminal, a base, a macro cell, a Node-B, an enhanced Node B (eNB), a gNB, a Home Node-B, a relay node, or a device, or described using other terminology used in the art. The BSs are generally part of a radio access network that may include one or more controllers communicably coupled to one or more corresponding BSs.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs transmit data using an orthogonal frequency division multiplexing (OFDM) modulation scheme on the downlink and the UEs transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BSs may communicate using other communication protocols, such as the IEEE 802.11 family of wireless communication protocols. Further, in some embodiments, the BSs may communicate over licensed spectrums, whereas in other embodiments the BSs may communicate over unlicensed spectrums. The present disclosure is not intended to be limited to the implementation of any particular wireless communication system architecture or protocol. In another embodiment, the BSs may communicate with the UEs using the 3GPP 5G protocols.

Duplex communication means bidirectional communication between two devices, where the transmissions over the link in each direction may take place at the same time (i.e., full duplex) or mutual exclusive time (i.e., half duplex). There are two types of duplex communication, one is the full duplex, which suggests that the transmissions over the link in each direction may take place at the same time, the other is half duplex, which means that the transmissions over the link in each direction may take place at mutual exclusive time.

Figure 2A:
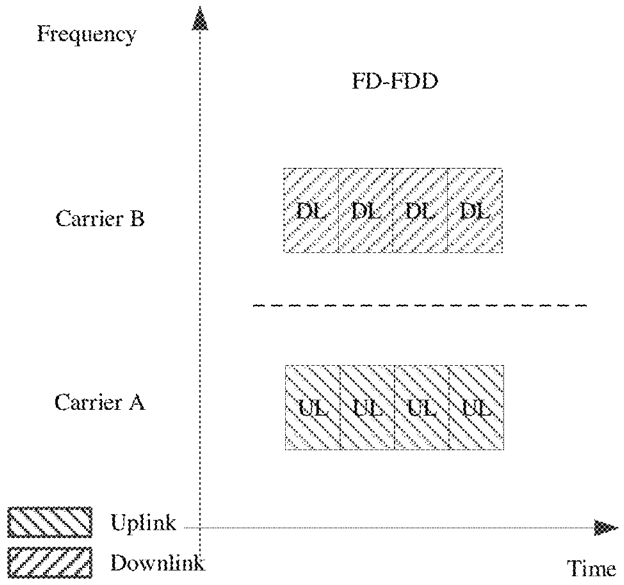
FIGS. 2A-2C illustrate three different duplex modes according to some embodiments of the present disclosure.
Figure 2B:
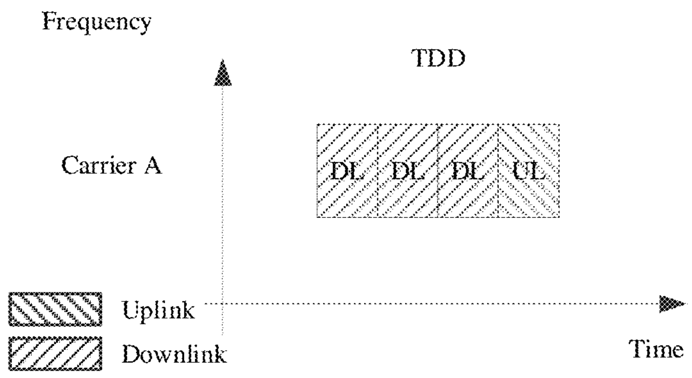
Figure 2C:
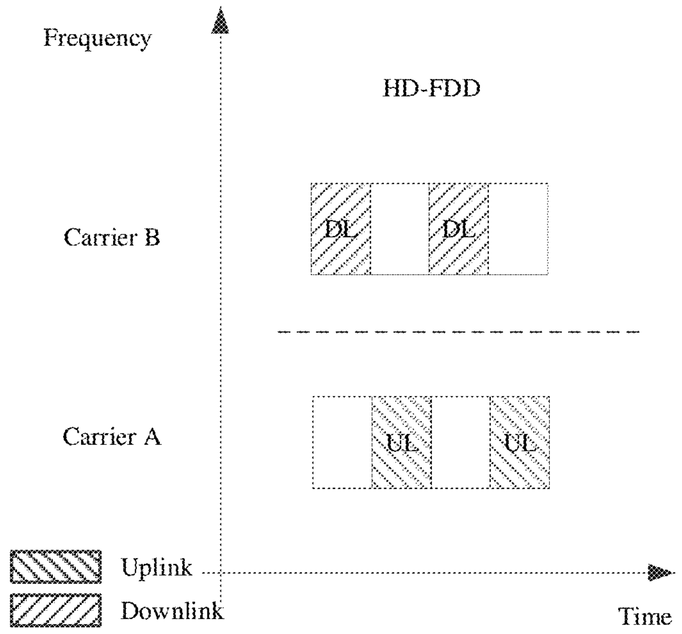

FIGS. 2A-2C illustrate three different duplex modes according to some embodiments of the present disclosure. FIG. 2A illustrates a full duplex frequency division duplex (FD-FDD) mode. The expression "UL" represents the uplink transmission, such as transmission from UE to gNB, and the expression "DL" represents the downlink transmission, such as transmission from gNB to UE, the uplink data is transmitted using carrier A, and the downlink data is transmitted using carrier B, different carrier frequencies are employed for each link direction. That is, the full duplex is achieved by different carrier frequencies.

In the case of half-duplex (HD) transceiver, the link directions are separated by time domain resources. FIG. 2B illustrates a TDD mode. When the same carrier frequency is used for each link direction, the HD transceiver is referred to be TDD system, while if different carrier frequencies are used, the system is half duplex FDD (HD-FDD) mode as shown in FIG. 2C. In the case of HD transceiver, the link directions are separated by time domain resources.

Figure 3:
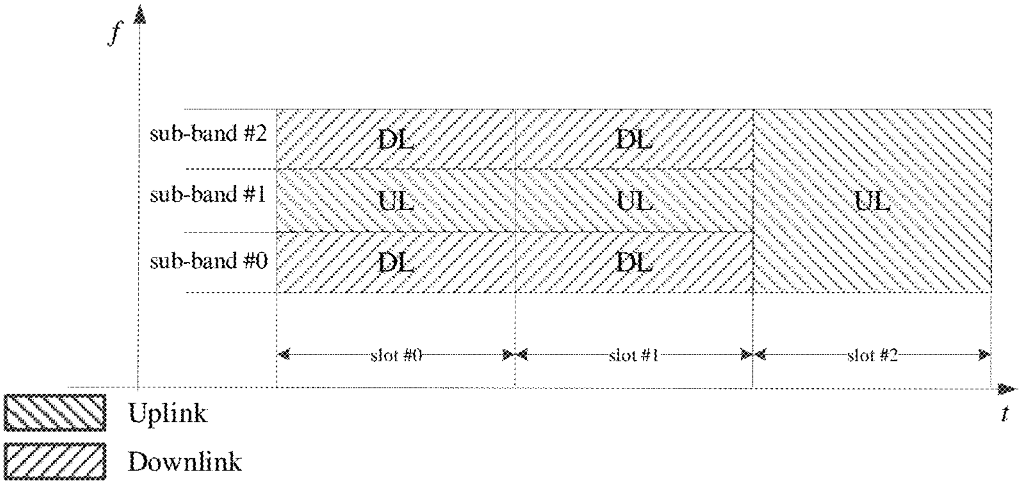
FIG. 3 illustrates an example of sub-band full duplex according to some embodiments of the present disclosure.

FIG. 3 illustrates an example of sub-band full duplex according to some embodiments of the present disclosure.

In FIG. 3, there are three slots, i.e. slot #0, slot #1, and slot #2. Within a TDD carrier, the bandwidth is divided into three sub-bands, which are referred to as sub-band #0, sub-band #1, and sub-band #2. The transmission direction is DL in sub-band #0 of slot #0, the transmission direction is UL in sub-band #1 of slot #0, and the transmission direction is DL in sub-band #0 of slot #0. For UE's point of view, in sub-band #0 of slot #0, DL reception could be performed, in sub-band #1 of slot #0, UL transmission could be performed, and in sub-band #0 of slot 0, DL reception could be performed.

Taking the TDD slot format in 5G NR as an example, the TDD slot format includes downlink symbols, uplink symbols and flexible symbols.

The slot format might be determined by a cell common UL or DL configuration, which may be referred to as "tdd-UL-DL-ConfigrationCommon," which is provided to the UE through system information, for example: SIB1. The parameter "tdd-UL-DL-ConfigrationCommon" includes configurations of a transmission pattern 1, which includes the following parameters:

a slot configuration period of P millisecond (msec), which is referred to as: dl-ul-transmission-periodicity;

a number of downlink slots $d_{slots}$, which is referred to as: nrofDownlinkSlots;

a number of downlink symbols $d_{sym}$, which is referred to as: nrofDownlinkSymbols;

a number of uplink slots $u_{slots}$, which is referred to as: nrofUplinkSlots; and a number of uplink symbols $u_{sym}$, which is referred to as: nrofUplinkSymbols.

Specifically, the slot configuration period of P msec includes S slots. In the S slots, the first $d_{slots}$ downlink slots include downlink symbols only and the last $u_{slots}$ uplink slots include uplink symbols only. The $d_{sym}$ downlink symbols after the $d_{slots}$ downlink slots are downlink symbols. The $u_{sym}$ uplink symbols preceding the last $u_{slots}$ uplink slots are uplink symbols. The remaining slots or symbols are flexible slots or symbols.

Regarding the "flexible" symbols, the UE cannot make any assumptions on the transmission direction. Downlink control signal (i.e., Physical Downlink Control Channel (PDCCH)) should be monitored in the flexible symbols and if a scheduling message is found, the UE should perform transmission or receiving accordingly. In addition, the flexible symbols also serve as guard period for the UEs to switch from DL reception to UL transmission.

Figure 4A:
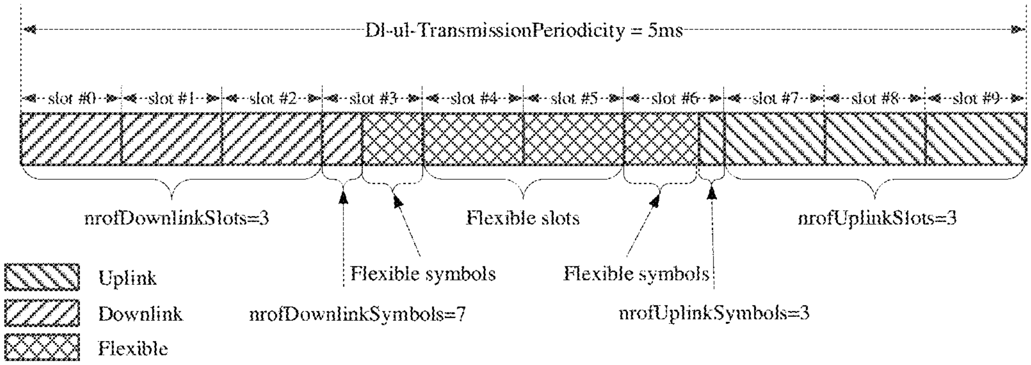
FIGS. 4A and 4B illustrate two examples of the slot formats according to some embodiments of the present disclosure.

FIG. 4A illustrates an example of the slot format determined based on the parameter "tdd-UL-DL-Configration-Common" according to some embodiments of the present disclosure.

In FIG. 4A, the slot configuration period is 5 ms, i.e. the value of the parameter: dl-ul-transmission-periodicity is 5 ms. The length of a slot is 0.5 ms, thus there are 10 slots within the slot configuration period, which are referred to as: slot #0, slot #1, slot #2, . . . , slot #9. Each slot may include 14 symbols.

The number of downlink slots, $d_{slots}$, is 3, i.e. the value of the parameter: nrofDownlinkSlots is 3, accordingly, the first three slots, slot #0, slot #1, and slot #2, are downlink slots.

The number of downlink symbols $d_{sym}$, is 7, i.e. the value of the parameter: nrofDownlinkSymbols is 7, accordingly, the first seven symbols that follows the last downlink slots (i.e. slot #2) is downlink symbols.

The number of uplink slots $u_{slots}$, is 3, i.e. the value of the parameter: nrofUplinkSlots is 3, accordingly, the last three slots, slot #7, slot #8, and slot #9, are uplink slots.

The number of uplink symbols $u_{sym}$, is 3, the value of the parameter: nrofUplinkSymbols is 3, accordingly, the last three symbols that precede the first uplink slot, are uplink symbols.

In FIG. 4A, slot #4 and slot #5 are flexible slots, and the symbols in slot #3 except the downlink symbols are flexible symbols, since each slot includes 14 symbols, and the number of the downlink symbols in slot #3 is 7, then the number of flexible symbols in slot #3 is calculated as: 14−7=7 symbols. Similarly, the symbols in slot #6 except the uplink symbols are flexible symbols, and the number of the uplink symbols in slot #6 is 3, then the number of flexible symbols in slot #6 is calculated as: 14−3=11 symbols.

The total number of the flexible symbols may be calculated as:

$$(S - d_{slot} - u_{slot}) \times N_{sym} - d_{sym} - u_{sym}$$

where $N_{sym}$ is the number of symbols in each slot.

The UE may be further provided with a UE specific configuration RRC signaling, which may be referred to as: "tdd-UL-DL-ConfigrationDedicated", the parameter "tdd-UL-DL-ConfigrationDedicated" overrides only flexible symbols per slot over the number of slots as provided by the parameter "tdd-UL-DL-ConfigrationCommon".

Specifically, the parameter "tdd-UL-DL-ConfigrationDedicated" provides a set of slot configurations by the parameter: "slotSpecificConfigurationsToAddModList". For each slot configuration from the set of slot configurations, the following parameters are included:

1. a slot index for a slot, which is referred to as: slotIndex; and
2. a set of symbols for a slot, which is referred to as: symbols.

The value of the parameter "symbols" may be:

a) allDownlink, which suggests that all symbols in the slot with the slot index are downlink;
b) allUplink, which suggests that all symbols in the slot with the slot index are uplink; or
c) explicit. In this case, the following two parameters may be provided:
   i. nrofDownlinkSymbols, which provides a number of downlink leading symbols in the slot with the slot index; and
   ii. nrofUplinkSymbols, which provides a number of uplink trailing symbols in the slot with the slot index.

If the parameter "nrofDownlinkSymbols" is not provided, there are no leading downlink symbols in the slot. If the parameter "nrofUplinkSymbols" is not provided, there are no trailing uplink symbols in the slot. The remaining symbols in the slot are flexible symbols.

For each slot having a corresponding index provided by parameter "slotIndex," the UE applies a format provided by a corresponding parameter "symbol". The UE does not expect that the parameter "tdd-UL-DL-ConfigrationDedicated" indicates a downlink symbol, which is indicated by the parameter "tdd-UL-DL-ConfigurationCommon," as uplink; or indicates an uplink symbol, which is indicated by the parameter "tdd-UL-DL-ConfigrationCommon," as downlink.

Figure 4B:
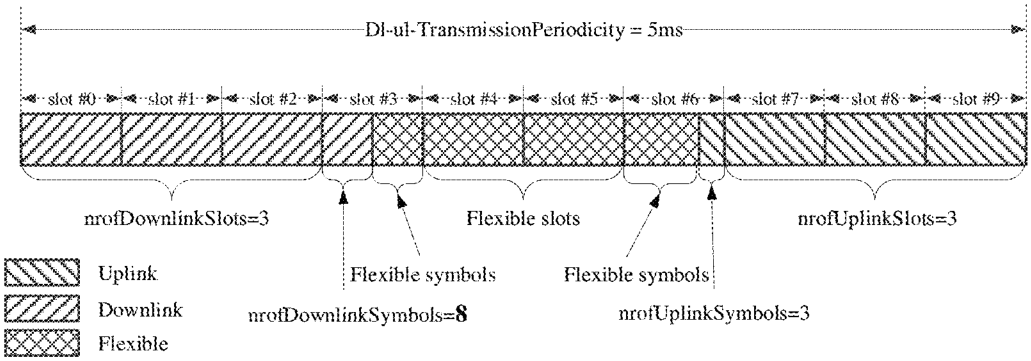

FIG. 4B illustrates an example of the slot format determined based on the parameter "tdd-UL-DL-Configration-Common" in FIG. 4A and the UE specific configuration RRC signaling, "tdd-UL-DL-ConfigrationDedicated".

In the scenario of FIG. 4B, the parameter "tdd-UL-DL-ConfigrationDedicated" includes the following parameters:

1. Slot index=3
2. The value of the parameter "symbols" is explicit; and
3. the parameter "nrofDownlinkSymbols" is 8.

Accordingly, in FIG. 4B, the number of downlink leading symbols in slot #3 is 8.

Furthermore, the transmission directions of the flexible symbols can be indicated by a dynamically signalling. Such signaling carries a slot format indicator (SFI) and will be received by a configured group of one or more devices.

According to the TDD UL or DL configuration as described in FIGS. 4A and 4B, it is observed that TDD UL or DL configuration supports only one transmission direction (i.e. DL, flexible, or UL) configuration for one time unit in one cell, but it cannot configure multiple transmission directions for different sub-bands at the same time unit in one cell. The time unit may be a symbol, a slot, a frame, a sub-frame, a set of symbols, or a set of slots, or the like. However, the slot format determined by the UL and DL configuration described in FIGS. 4A and 4B does not relate to the sub-band full duplex as described in FIG. 3, and solutions for determining the slot format are needed.

The present disclosure proposes several solutions for determining the slot format, which includes multiple transmission directions for the same time unit (such as a slot) to realize sub-band full duplex.

Figure 5A:
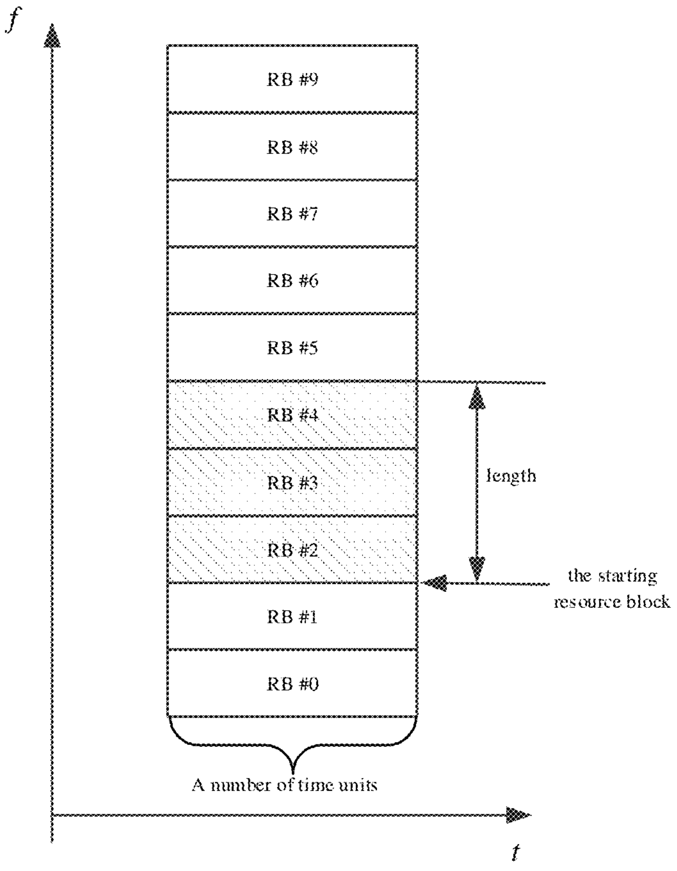
FIGS. 5A and 5B illustrate some solutions for indicating the frequency domain resource for the sub-band(s) according to some embodiments of the present disclosure.
Figure 5B:
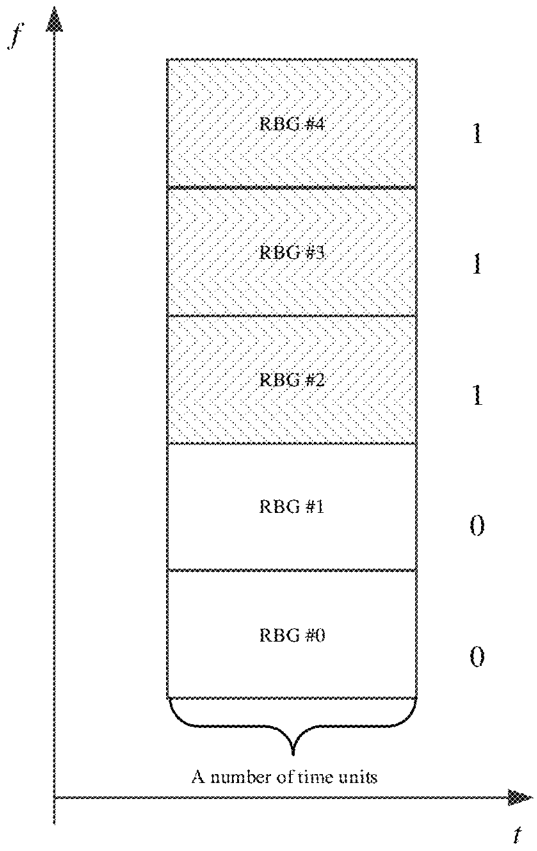

FIGS. 5A and 5B illustrate some solutions for indicating the frequency domain resource for the sub-band(s) according to some embodiments of the present disclosure.

The present disclosure introduces the first indication to indicate the frequency domain resource (such as one or more RBs, one or more RB groups (RBG), or the like) of the sub-band within a band width part (BWP) of a number of time units as uplink frequency domain resources or downlink frequency domain resources. Hereinafter the present disclosure uses indicating the frequency domain resources as uplink frequency domain resources as an example to illustrate the solutions, and the illustrated solutions also apply to the cases of indicating the frequency domain resources as downlink frequency domain resources.

Specifically, the first indication indicates two parameters, 1): the starting RB, which may be referred to as: $RB_{start}$, and 2): a length in terms of contiguously allocated RBs, which may be referred to as: $L_{RBs}$. For example, in FIG. 5A, there are ten resource blocks (RB), which are referred to as RB #0, RB #1, RB #2, . . . , RB #9, respectively. The index of the starting RB is RB #2, and the length of contiguously allocated RBs is 3. Thus, from RB #2 to RB #4 in frequency domain, and in the number of time units, these RBs are configured as the uplink sub-band.

In some embodiments, the first indication includes the above two parameters, $RB_{start}$ and $L_{RBs}$, and transmits them directly to the UE. In some other embodiments, the two parameters are indicated jointly.

For example, the first indication may be a resource indication value (RIV), which is used to indicate the starting RB and the length of contiguously allocated RBs. Specifically, the RIV is defined by $$\begin{aligned}&\text{if } (L_{RBs}-1) \le \lfloor N/2 \rfloor \text{ then}\\&\quad RIV = N(L_{RBs}-1) + RB_{start}\\&\text{else}\\&\quad RIV = N(N-L_{RBs}+1) + (N-1-RB_{start})\end{aligned}$$

Where $L_{RBS} \geq 1$ and shall not exceed $N-RB_{start}$, and N is the total number of RBs in the cell (if the indication is cell specific), or N is the total number of RBs in the UE's configured BWP (if the indication is BWP specific).

For example, assuming that the total number of RBs is 100, i.e. N=100, the starting RB, $RB_{start}$, is 10, and the length of the and contiguously allocated RBs, $L_{RBs}$, is 20, then the value of $L_{RBs}-1$ is 19, which is smaller than the value $\lfloor N/2 \rfloor$, 50. Therefore, the value of RIV is $N(L_{RBs}-1)+RB_{start}=100\times(20-1)+10=1910$.

For another example, assuming that the total number of RBs is 100, i.e. N=100, the starting RB, $RB_{start}$, is 10, and the length of the and contiguously allocated RBs, $L_{RBs}$, is 70, then the value of $L_{RBs}-1$ is 69, which is not smaller than the value $\lfloor N/2 \rfloor$, 50. Therefore, the value of RIV is $N(N-L_{RBs}+1)+(N-1-RB_{start})=100\times(100-70+1)+(100-1-10)=3189$.

Alternatively, the first indication may be a bitmap. Each bit in the bitmap corresponds to one or more RBs, one or more RB groups (RBG), or one or more sets of RBs, or the like. An RBG is a set of consecutive RBs defined by a higher layer parameter, and the total number of RBs in an RBG may be any number. In some scenarios, the number of RBs in an RBG may be an integer multiple of 6, since the size of control resource set (CORESET) is an integer multiple of 6, which could guarantee the resource utilization.

The BS may transmit the bitmap to the scheduled UE to indicate the allocated RBGs. For example, in FIG. 5B, assuming that the total number of RBs is 100, and the size of a RBG is 20RB, thus there are 5 RBGs in total, i.e. RBG #0, RBG #1, RBG #2, RBG #3, and RBG #4. The BS uses 5 bits to indicate the 5 RBGs. For example, the value of the bitmap is "00111", which indicates that the third RBG, i.e. RBG #2, the fourth RBG, i.e. RBG #3, and the fifth RBG, i.e. RBG #4 are used for the sub-band.

For another instance, assuming that the total number of RBs is 100, and the size of a RBG is 10RB, thus there are 10 RBGs in total. The BS uses 10 bits to indicate the 10 RBGs. For example, the value of the bitmap is "1110000000", which indicates that the first 3 RBGs are used for the sub-band.

The first indication that indicates the frequency resource allocation may be carried by higher layer parameter or downlink control information (DCI), or other signal. The first indication may be a new information element or carried in the legacy information element, and it could be cell specific or BWP specific.

After receiving the first indication, the UE may determine the slot format based on the first indication and some predefined rules relating to the time domain location.

Figure 6A:
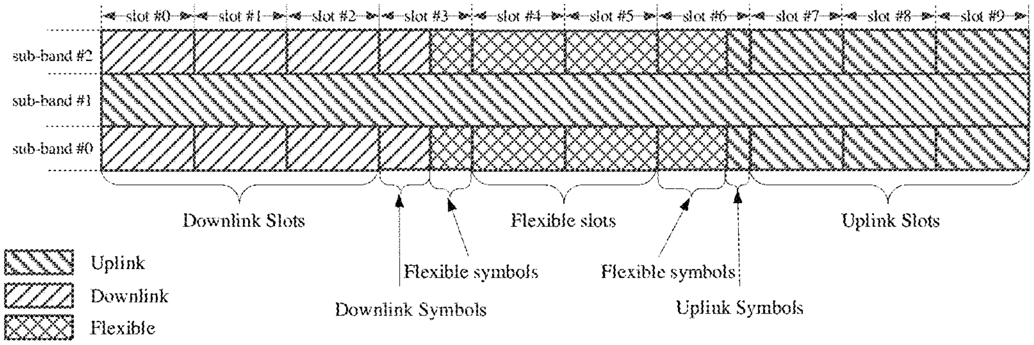
FIGS. 6A-6C illustrate three exemplary solutions for determining a slot format according to some embodiments of the present disclosure.
Figure 6B:
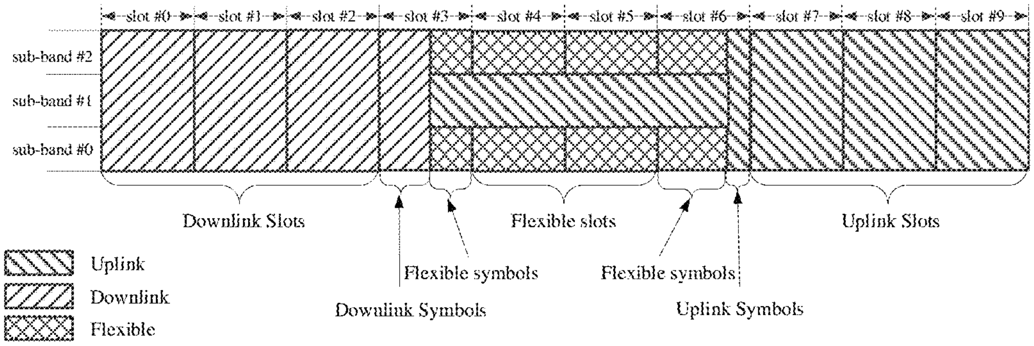
Figure 6C:
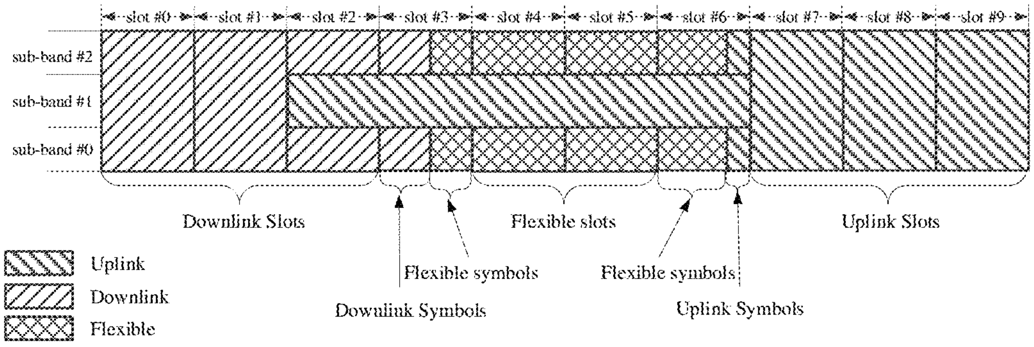

FIGS. 6A-6C illustrate three exemplary solutions for determining a slot format according to some embodiments of the present disclosure.

In FIGS. 6A-6C, the slot format determined based on UL and DL configuration is based on FIG. 4B.

After receiving the first indication as described in any of FIGS. 5A and 5B, for example, the first indication indicates the frequency domain resource of sub-band #1, in this case, the sub-band #1 may be referred to as the uplink or downlink sub-band, the UE then determines the time domain location for uplink or downlink sub-band according to one of the following rules:

Rule 1: the transmission direction of the indicated sub-band in each time unit of the total number of time units is uplink or downlink. That is, the time domain location includes all the slots. For example, in FIG. 6A, the transmission direction of sub-band #1 in sub-band #1 of the 10 slots is uplink.

Rule 2: the transmission direction of the indicated sub-band in all flexible time units of the number of time units is uplink or downlink. That is, the time domain location includes all the flexible time units. The flexible time units, such as flexible slots or flexible symbols, which are indicated by the parameter "tdd-UL-DL-ConfigurationDedicated" or "tdd-UL-DL-ConfigurationCommon", are considered as uplink slots or uplink symbols, or downlink slots or downlink symbols. For example, in FIG. 6B, the flexible slots and flexible symbols are considered as uplink slots or uplink symbols according to rule 2.

Rule 3: the transmission direction of the indicated sub-band in a time unit of the number of time units is determined according to a dedicated transmission direction configuration. The dedicated transmission direction configuration may be the parameter "tdd-UL-DL-ConfigurationDedicated".

For example, if the symbols are indicated as downlink or flexible by the parameter "tdd-UL-DL-ConfigurationCommon," but are indicated as uplink by the parameter "tdd-UL-DL-ConfigurationDedicated", then the time domain location of the uplink sub-band is the uplink symbols, as indicated by the parameter "tdd-UL-DL-ConfigurationDedicated".

As shown in FIG. 6C, the dedicated transmission direction configuration indicates the following slots indexes: slotIndex=2, slotIndex=3, slotIndex=4, slotIndex=5 and slotIndex=6, and the value of the parameter "symbols" is "allUplink", which suggests that all symbols in the slot with the slot index are uplink. Therefore, the transmission direction of slot #2, slot #3, slot #4, slot #5, and slot #6 within sub-band #1 is uplink.

In the above cases, the transmission direction of the uplink sub-band (or downlink sub-band) in a time unit (e.g. a slot) of the number of time units is determined by predefined rules, in some other embodiments, the slots, in which the transmission directions of the sub-band is uplink, may be indicated by the network. For example, the network may transmit the second indication to indicate the time units, in which the transmission direction of the sub-band is uplink (or downlink).

Figure 7A:
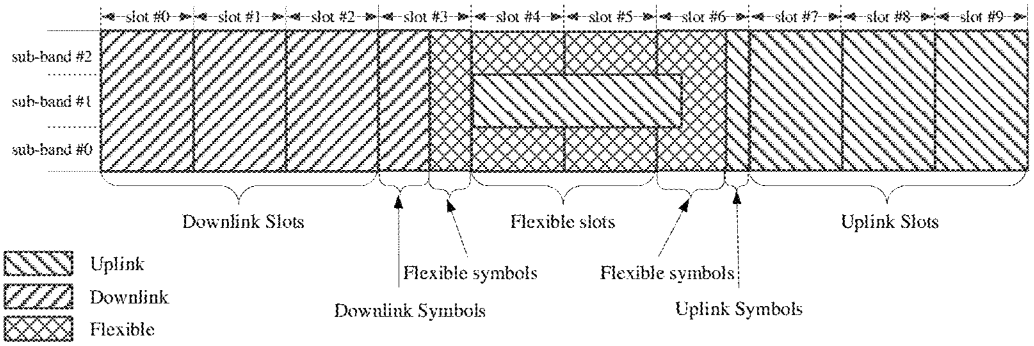
FIGS. 7A and 7B illustrate two exemplary solutions for determining a slot format according to some embodiments of the present disclosure.
Figure 7B:
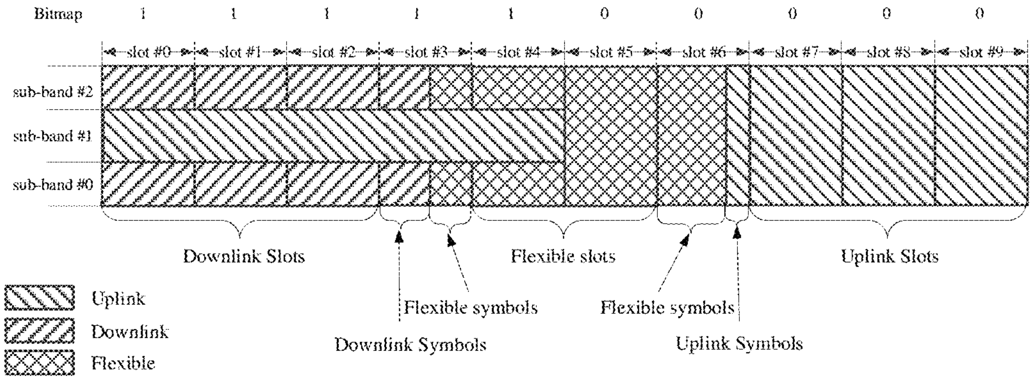

FIGS. 7A and 7B illustrate two exemplary solutions for determining a slot format according to some embodiments of the present disclosure.

In FIGS. 7A and 7B, after receiving the parameter "tdd-UL-DL-ConfigurationDedicated" or "tdd-UL-DL-ConfigurationCommon", the UE determines the slot format, for example, the slot format as shown in FIG. 4B, wherein flexible slots or flexible symbols are included. Furthermore, the UE also receives the first indication indicating that sub-band #1 is the uplink sub-band.

In FIG. 7A, the UE receives the second indication, which indicate a number of slots (for example, the number is X), and/or a number of symbols, (for example, the number is Y), which indicates that the transmission direction of the first (or the last) X slots and/or the first (or the last) Y symbols among all flexible slots is uplink (or downlink).

For example, X=2 and Y=1, which suggests that the first 2 slots among the flexible slots are uplink slots, and one symbol following the first 2 slots is indicated as uplink. As shown in FIG. 7A, the transmission direction in slot #4, slot #5, and one symbol after slot #5, within sub-band #1 is determined as uplink.

In some other cases, slot #3, which includes flexible symbols, is considered as the first flexible slot, then the transmission direction in slot #3, slot #4, and one symbol following slot #4, within sub-band #1 is determined as uplink.

The second indication may indicate the time units in other forms, and the solution also applies to the scenario that the second indication indicating other forms of time units.

In FIG. 7B, the UE receives the second indication, which indicates the time domain location of the uplink sub-band in a pre-determined period. Specifically, the second indication may be a bitmap, each bit indicates a time unit whether this time unit includes an uplink sub-band (or uplink RBs). For example, the bitmap may be 10 bits, each bit indicates whether this slot includes an uplink sub-band in every 10 slots.

In FIG. 7B, the second indication indicates "1111100000," which means that the first 5 slots within the 10 slots include the uplink sub-band (or downlink sub-band), i.e. the resources within sub-band #1 and the first 5 slots (slot #0, slot #1, slot #2, slot #3, and slot 4) are for uplink transmission.

The first indication for frequency domain location and the second indication for time domain location may be carried by higher layer parameter or downlink control information. In some other scenarios, the first indication and the second indication may be new information elements, or carried in the legacy information element and could be cell specific or BWP specific.

In some other embodiments, the slot formats for different sub-bands may be indicated separately. In other words, for each sub-band within a BWP, a TDD DL or UL configuration information is indicated. The indicated TDD DL or UL configuration may be the parameter "tdd-UL-DL-ConfigurationDedicated" or "tdd-UL-DL-ConfigurationCommon", or may be other parameters carried in higher layer signaling or downlink control information. In some other embodiments, the indication may be a new information element or carried in the legacy information element.

FIGS. 8A-8D illustrates an exemplary solution for determining a slot format according to some embodiments of the present disclosure.

Figure 8A:
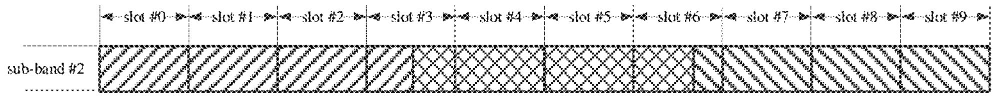
FIGS. 8A-8D illustrate an exemplary solution for determining a slot format according to some embodiments of the present disclosure.
Figure 8B:
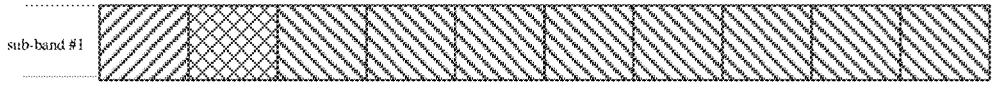
Figure 8C:
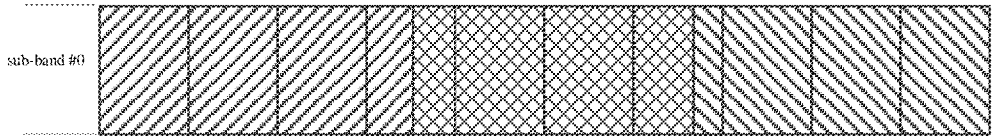

For example, as shown in FIGS. 8A-8C, for each sub-band, sub-band #0, sub-band #1, and sub-band #2, which are within one BWP, a TDD UL and DL configuration information is configured for each sub-band. And as described in any of FIGS. 5A and 5B, for example, the first indication indicates the frequency domain resource of each sub-band.

Figure 8D:
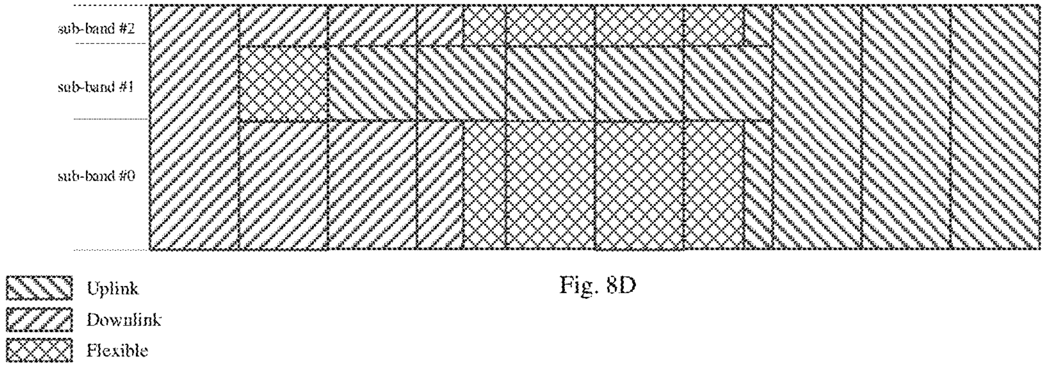

After receiving the UL and DL configuration for each sub-band, the UE determines the slot format for each sub-band, and obtains a complete slot format as shown in FIG. 8D based on FIGS. 8A-8C.

In some other embodiments, a transmission direction format set may be predefined in the 3GPP documents or may be indicated by higher layer parameters from the BS. Each transmission direction format of the transmission direction format set indicates the sub-band structure of a time unit (such as a slot or a symbol). The format may include the total number of the sub-bands and the direction of each sub-band, and the format may be: {all DL}, {all UL}, {all flexible}, {DL, UL, DL}, or {flexible, UL, flexible}, or any combination of the transmission directions: DL, UL, and/or flexible.

For example, a transmission direction format set include five transmission direction formats are defined and these five transmission direction formats are indexed from 0 to 4 is listed in table 1 below.

TABLE 1 a transmission direction format set

| index | Format |
|---|---|
| 0 | all DL |
| 1 | all UL |
| 2 | all flexible |
| 3 | DL-UL-DL |
| 4 | flexible -UL- flexible |

For example, for the transmission direction format set with the index 3, the transmission direction format is DL-UL-DL, which means that for the indicated time unit, there are three sub-bands, and the transmission direction of each sub-band of the indicated time unit is downlink, uplink and downlink in an ascending order (or a descending order) of their starting RB indexes.

Although only five transmission direction formats are included in table 1, it should be noted that the transmission direction format may include any other combination of the transmission directions: DL, UL, and flexible.

A table of a transmission direction format combination set may be provided to the UE by higher layer parameter, and each combination includes one or multiple transmission direction formats from the format sets to indicate the sub-band structure of one or multiple slots or symbols.

For example, a transmission direction format combination set include three combinations are defined and these three combinations are indexed from 0 to 2 as list in table 2 below.

TABLE 2

| a transmission direction format combination set | | | | | |
|---|---|---|---|---|---|
| index | slot #0 | slot #1 | slot #2 | . . . | slot #N |
| i) | 0 | 3 | 1 | . . . | . . . |
| ii) | 3 | 4 | 1 | . . . | . . . |
| iii) | 3 | 3 | 1 | . . . | . . . |

Figure 9:
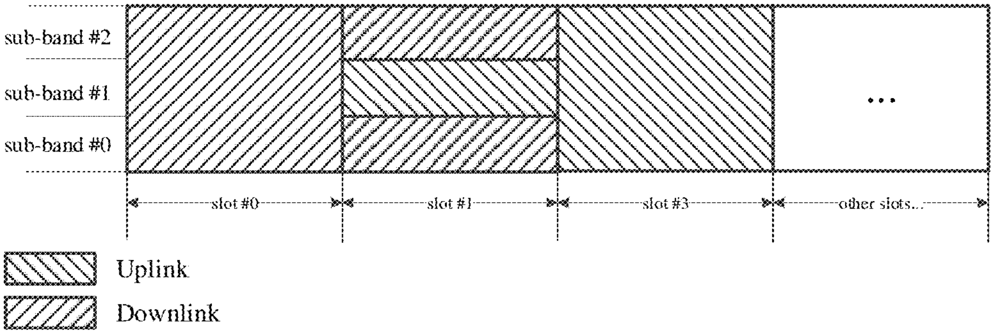
FIG. 9 illustrates an exemplary solution for determining a slot format according to some embodiments of the present disclosure.

FIG. 9 illustrates an exemplary solution for determining a slot format according to some embodiments of the present disclosure.

FIG. 9 illustrates the format combination set with the index i), which indicates a transmission direction format combination for N slots. For slot #0, the format index is "0", which refers to the index "0" in table 1, i.e. "all DL", for slot #1, the format is "3", which refers to the index "3" in table 1, i.e. "DL-UL-DL". Accordingly, in this slot, three sub-bands are included, and the frequency domain resource of the three sub-bands may be indicated with the first indication as described in FIGS. 5A and 5B. The transmission direction of each sub-band in slot #1 is downlink, uplink and downlink in an ascending order (or a descending order) of their starting RB indexes. For slot #2, the format is "1", which refers to the index "1" in table 1, i.e. "all UL." Other slots are not described in table 2, and it may be any slot format of the transmission directions: DL, UL, and flexible.

Although only three transmission direction format combinations are included in table 2, it should be noted that the transmission direction format combinations may include any other transmission direction formats for one or more of the N slots, and the solutions of the present disclosure also apply to these transmission direction format combinations.

Then indication indicating the format combination set may be transmitted by the BS, and correspondingly received by the UE, to indicate one format combination from the format combination set to indicate the sub-band structure of one or multiple slots or symbols. The indication may be carried by DCI, and the first indicated slot could be the slot in which the DCI is received, or the slot after the slot in which the DCI is received.

If UE received DCI 1 to indicate the sub-band structure of following N time units, and after UE received DCI 2 to indicate the sub-band structure of following M time units, if N time units and M time units are overlapped, UE does not expect the sub-band structure of the overlapped time units are different.

In some other scenarios, suppose the UE received the parameter: "tdd-UL-DL-ConfigurationDedicated", "tdd-UL-DL-ConfigurationCommon", or slot format indicator (SFI), and has determined the first transmission direction within the sub-bands of the number of slots. The UE then receives the above-mentioned indications, for example, the first indication as described in FIGS. 5A and 5B, and/or the second indication as described in FIGS. 7A and 7B, the UE may also determine the second transmission direction for a sub-band of the number of slots based on the indications. If the first transmission direction of the corresponding sub-band of the number of slots is different from the second transmission of the sub-band of the number of slots, the UE determines the second transmission direction as the final transmission direction. In other words, the second transmission direction overrides the first transmission direction.

In some other cases, the second transmission direction does not override the first transmission direction.

It should be noted that although a limited number of sub-bands and a limited number of slots are described in the present disclosure, the solutions of the present disclosure also applies to other number of sub-bands and/or slots.

Furthermore, the above indications in the present disclosure, such as the first indication, the second indication, the indication for indicating the format combination set, or the like, may be transmitted by the BS, and correspondingly received by the UE. The indications may be carried by higher layer parameter or DCI, or other signal. The indications may be a new information element or carried in the legacy information element, and they could be cell specific or BWP specific.

Figure 10:
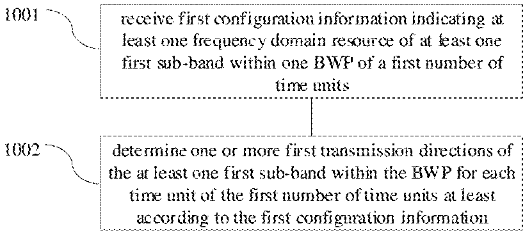
FIG. 10 illustrates a method performed by a UE for wireless communication according to a preferred embodiment of the present disclosure.

FIG. 10 illustrates a method performed by a UE for wireless communication according to a preferred embodiment of the present disclosure.

In step 1001, the UE receives first configuration information indicating at least one frequency domain resource of at least one first sub-band within one BWP of a first number of time units; and in step 1002, the UE determines one or more first transmission directions of the at least one first sub-band within the BWP for each time unit of the first number of time units at least according to the first configuration information.

In some embodiments, the first configuration information indicates a starting RB index and a total number of RBs of each sub-band of the at least first one sub-band separately or jointly. For example, in FIG. 5A, the first configuration information indicates the starting RB is RB #2, and the total number of RBs is 3.

In some other embodiments, the first configuration information indicates the occupied RBG of each sub-band of the at least first one sub-band by a first bitmap with each bit corresponding to a RBG. For instance, in FIG. 5B, the first configuration information indicates occupied RBG of a sub-band by the bitmap "00111".

In some embodiments, the UE determines determine the one or more first transmission directions of the at least one first sub-band for each time unit of the first number of time units according to the first configuration information and one of the following rules:

Rule 1: the first transmission direction of the at least one first sub-band in each time unit of the first number of time units is uplink or downlink. For example, in FIG. 6A, the transmission direction of sub-band #1 in each slot of the 10 slots is uplink.

Rule 2: the first transmission direction of the at least one first sub-band in all flexible time units of the first number of time units is uplink or downlink. For example, in FIG. 6B, the transmission direction of sub-band #1 in each flexible symbols (or slots) of the flexible symbols (or slot) is uplink.

Rule 3: the first transmission direction of the at least one first sub-band in a time unit of the first number of time units is determined according to a dedicated transmission direction configuration. For example, in FIG. 6C, the dedicated transmission direction configuration indicates the following slots indexes: slotIndex=2, slotIndex=3, slotIndex=4, slotIndex=5 and slotIndex=6, and the value of the parameter "symbols" is "allUplink", which suggests that all symbols in the slot with the slot index are uplink. Therefore, the transmission direction of slot #2, slot #3, slot #4, slot #5, and slot #6 within sub-band #1 is uplink.

In some embodiments, the UE may receive second configuration information indicating at least one time unit within the first number of time units in which the first transmission directions of the at least one first sub-band is uplink or downlink; and the UE determines the one or more first transmission directions of the at least one frequency domain resource for each time unit of the first number of time units according to the first configuration information and the second configuration information.

In some embodiments, the second configuration information includes a second number of slots and a third number of symbols among flexible slots of the first number of time units. For example, in FIG. 7A, the second configuration information includes 2 slots and one symbol.

In some embodiments, the second configuration information includes a second bitmap with each bit corresponding to a time unit in the first number of time units. For example, in FIG. 7B, the second configuration information includes a bitmap "111110000".

In some embodiments, the UE receives one or more second configuration information, wherein each second configuration information indicates transmission directions for one sub-band of the at least one first sub-band within the BWP of the first number of time units; and the UE determines the one or more first transmission directions of the at least one first sub-band within the BWP for each time unit of the first number of time units according to the first configuration information and the one or more second configuration information. For example, in FIGS. 8A-8C, the UE receives three second configuration information, each indicates transmission directions for one sub-band from slot #0 to slot #9. The UE then determines the transmission directions of the three sub-bands for each slot.

In some embodiments, the UE receives third configuration information indicating a transmission direction format combination in a transmission direction format combination set, wherein each transmission direction format combination includes one or more transmission direction format of one or more time units, and each transmission direction format indicates at least one transmission direction of at least one first sub-band for a time unit; and the UE determines the one or more first transmission directions of the at least one first sub-band for each time unit of the first number of time units according to the first configuration information and the third configuration information. For example, as shown in FIG. 9, the UE may receive an index in the above-mentioned table 2, and the UE determines the transmission directions of three sub-bands.

In some embodiments, each transmission direction format is included in a transmission direction format set, and wherein the transmission direction format set is predefined or indicated by fourth configuration information received by the transceiver. For example, the transmission direction format set may be the above-mentioned table 1, and it may be predefined in 3GPP documents.

In some embodiments, the transmission direction format combination set is predefined or indicated by fifth configuration information received by the transceiver. For example, the transmission direction format combination set may be the above-mentioned table 2, and it may be predefined in 3GPP documents.

In some embodiments, the UE receives sixth configuration information indicating a second transmission direction of a second sub-band within the BWP of a second time unit, wherein the second sub-band is included in the at least one first sub-band, and the second time unit is included in the first time units; and if the second transmission direction of the second sub-band of the second time unit is different from the first transmission direction of the second sub-band of the second time unit, the UE determines a final transmission direction of the second sub-band of the second time unit according to first transmission direction.

Figure 11:
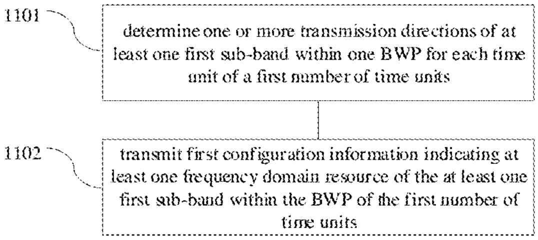
FIG. 11 illustrates a method performed by a BS for wireless communication according to a preferred embodiment of the present disclosure.

FIG. 11 illustrates a method performed by a BS for wireless communication according to a preferred embodiment of the present disclosure.

In step 1101, the BS determines one or more transmission directions of at least one first sub-band within one BWP for each time unit of a first number of time units, and in step 1102, the BS transmits first configuration information indicating at least one frequency domain resource of the at least one first sub-band within the BWP of the first number of time units.

Figure 12:
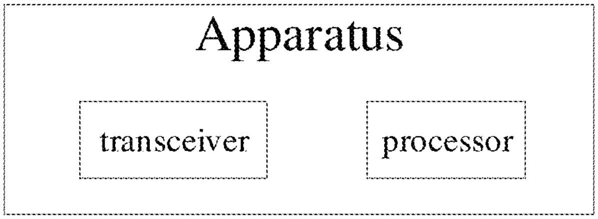
FIG. 12 illustrates a block diagram of an apparatus according to the embodiments of the present disclosure.

FIG. 12 illustrates a block diagram of an apparatus according to the embodiments of the present disclosure.

The apparatus may be or include at least a part of a BS, a UE, or other device with similar functionality.

The apparatus may include a transmitter, a processor, and a transceiver coupled with the processor. In some embodiments, the transmitter and the receiver can be combined into a transceiver. The processor is configured to perform any of the methods described in the present disclosure, for example, the method described with respect to FIGS. 10 and 11. For example, when the apparatus is implemented as a UE, the receiver may first configuration information indicating at least one frequency domain resource of at least one first sub-band within one BWP of a first number of time units. The processor may determine one or more first transmission directions of the at least one first sub-band within the BWP for each time unit of the first number of time units at least according to the first configuration information.

When the apparatus is implemented as a BS, the processor may determine one or more transmission directions of at least one first sub-band within one band width part (BWP) for each time unit of a first number of time units, and the transmitter may transmit first configuration information indicating at least one frequency domain resource of the at least one first sub-band within the BWP of the first number of time units.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each Fig. are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as “first,” “second,” and the like may be used solely to distinguish one entity or action from another entity or action without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “a,” “an,” or the like does not, without more constraints, preclude the existence of additional identical elements in the process, method, article, or apparatus that comprises the element. Also, the term “another” is defined as at least a second or more. The terms “including,” “having,” and the like, as used herein, are defined as “comprising.”

The invention claimed is:

1. A user equipment (UE) for wireless communication, comprising:
- at least one memory; and
- at least one processor coupled with the at least one memory and configured to cause the UE to:
  - receive first configuration information indicating at least one frequency domain resource of at least one first sub-band within one band width part (BWP) of a first number of time units;
  - receive second configuration information indicating at least one time unit within the first number of time units in which one or more first transmission directions of the at least one first sub-band is uplink or downlink; and
  - determine the one or more first transmission directions of the at least one first sub-band within the one BWP for each time unit of the first number of time units at least according to the first configuration information and the second configuration information.

2. The UE of claim 1, wherein
- the first configuration information indicates a starting resource block (RB) index and a total number of RBs of each sub-band of the at least first one sub-band separately or jointly; or
- the first configuration information indicates an occupied RB group (RBG) of each sub-band of the at least one first sub-band by a first bitmap with each bit corresponding to an RBG.

3. The UE of claim 1, wherein the at least one processor is further configured to cause the UE to:
- determine the one or more first transmission directions of the at least one first sub-band for each time unit of the first number of time units according to the first configuration information and one of multiple rules that include:
  - the one or more first transmission directions of the at least one first sub-band in each time unit of the first number of time units is uplink or downlink;
  - the one or more first transmission directions of the at least one first sub-band in all flexible time units of the first number of time units is uplink or downlink, or
  - the one or more first transmission directions of the at least one first sub-band in a time unit of the first number of time units is determined according to a dedicated transmission direction configuration.

4. The UE of claim 1, wherein
- the second configuration information includes a second number of slots and a third number of symbols among flexible slots of the first number of time units; or
- the second configuration information includes a second bitmap with each bit corresponding to a time unit in the first number of time units.

5. The UE of claim 1, wherein the at least one processor is further configured to cause the UE to:
- receive one or more second configuration information, wherein each second configuration information indicates transmission directions for one sub-band of the at least one first sub-band within the one BWP of the first number of time units; and
- determine the one or more first transmission directions of the at least one first sub-band within the one BWP for each time unit of the first number of time units according to the first configuration information and the one or more second configuration information.

6. The UE of claim 1, wherein the at least one processor is further configured to cause the UE to:
- receive third configuration information indicating a transmission direction format combination in a transmission direction format combination set, wherein each transmission direction format combination includes one or more transmission direction format of one or more time units, and each transmission direction format indicates at least one transmission direction of at least one first sub-band for a time unit; and
- determine the one or more first transmission directions of the at least one first sub-band for each time unit of the first number of time units according to the first configuration information and the third configuration information.

7. The UE of claim 6, wherein each transmission direction format is included in a transmission direction format set, and wherein the transmission direction format set is predefined or indicated by fourth configuration information received by the UE.

8. The UE of claim 6, wherein the transmission direction format combination set is predefined or indicated by fifth configuration information received by the UE.

9. The UE of claim 1, wherein the at least one processor is further configured to cause the UE to:

receive sixth configuration information indicating a second transmission direction of a second sub-band within the BWP of a second time unit, wherein the second sub-band is included in the at least one first sub-band, and the second time unit is included in the first time units; and if the second transmission direction of the second sub-band of the second time unit is different from a first transmission direction of the second sub-band of the second time unit, determine a final transmission direction of the second sub-band of the second time unit according to the first transmission direction.

10. A Base Station (BS) for wireless communication, comprising:

at least one memory; and at least one processor coupled with the at least one memory and configured to cause the BS to:

determine one or more transmission directions of at least one first sub-band within one band width part (BWP) for each time unit of a first number of time units;

transmit first configuration information indicating at least one frequency domain resource of the at least one first sub-band within the one BWP of the first number of time units; and transmit second configuration information indicating at least one time unit within the first number of time units in which the one or more transmission directions of the at least one first sub-band is uplink or downlink.

11. The BS of claim 10, wherein the first configuration information indicates a starting resource block (RB) index and a total number of RBs of each sub-band of the at least first one sub-band separately or jointly; or the first configuration information indicates at least one occupied RB group (RBG) of each sub-band of the at least one first sub-band by a first bitmap with each bit corresponding to an RBG.

12. The BS of claim 10, wherein the at least one processor is further configured to cause the BS to:

determine the one or more transmission directions of the at least one first sub-band for each time unit of the first number of time units according to the first configuration information and one of multiple rules that include:

the one or more transmission directions of the at least one first sub-band in each time unit of the first number of time units is uplink or downlink;

the one or more transmission directions of the at least one first sub-band in all flexible time units of the first number of time units is uplink or downlink, or the one or more transmission directions of the at least one first sub-band in a time unit of the first number of time units is determined according to a dedicated transmission direction configuration.

13. A method performed by a user equipment (UE), the method comprising:

receiving first configuration information indicating at least one frequency domain resource of at least one first sub-band within one band width part (BWP) of a first number of time units;

receiving second configuration information indicating at least one time unit within the first number of time units in which one or more first transmission directions of the at least one first sub-band is uplink or downlink; and determining the one or more first transmission directions of the at least one first sub-band within the one BWP for each time unit of the first number of time units at least according to the first configuration information and the second configuration information.

14. A processor for wireless communication, comprising:

at least one controller coupled with at least one memory and configured to cause the processor to:

receive first configuration information indicating at least one frequency domain resource of at least one first sub-band within one band width part (BWP) of a first number of time units;

receive second configuration information indicating at least one time unit within the first number of time units in which one or more first transmission directions of the at least one first sub-band is uplink or downlink; and determine the one or more first transmission directions of the at least one first sub-band within the one BWP for each time unit of the first number of time units at least according to the first configuration information and the second configuration information.

15. The processor of claim 14, wherein the first configuration information indicates a starting resource block (RB) index and a total number of RBs of each sub-band of the at least first one sub-band separately or jointly; or the first configuration information indicates an occupied RB group (RBG) of each sub-band of the at least one first sub-band by a first bitmap with each bit corresponding to an RBG.

16. The processor of claim 14, wherein the at least one controller is further configured to cause the processor to:

determine the one or more first transmission directions of the at least one first sub-band for each time unit of the first number of time units according to the first configuration information and one of multiple rules that include:

the one or more first transmission directions of the at least one first sub-band in each time unit of the first number of time units is uplink or downlink;

the one or more first transmission directions of the at least one first sub-band in all flexible time units of the first number of time units is uplink or downlink, or the one or more first transmission directions of the at least one first sub-band in a time unit of the first number of time units is determined according to a dedicated transmission direction configuration.

17. The processor of claim 14, wherein the at least one controller is further configured to cause the processor to:

receive one or more second configuration information, wherein each second configuration information indicates transmission directions for one sub-band of the at least one first sub-band within the one BWP of the first number of time units; and processor determine the one or more first transmission directions of the at least one first sub-band within the one BWP for each time unit of the first number of time units according to the first configuration information and the one or more second configuration information.

18. The BS of claim 10, wherein the second configuration information includes a second number of slots and a third number of symbols among flexible slots of the first number of time units; or the second configuration information includes a second bitmap with each bit corresponding to a time unit in the first number of time units.

19. The method of claim 13, wherein the second configuration information includes a second number of slots and a third number of symbols among flexible slots of the first number of time units; or the second configuration information includes a second bitmap with each bit corresponding to a time unit in the first number of time units.

20. The processor of claim 14, wherein the second configuration information includes a second number of slots and a third number of symbols among flexible slots of the first number of time units; or the second configuration information includes a second bitmap with each bit corresponding to a time unit in the first number of time units.

* * * * *